(12) United States Patent
Beaty Bishop (10) Patent No.: US 7,628,119 B2
(45) Date of Patent: Dec. 8, 2009

(54) PET CONTAINMENT DEVICE AND METHOD

(76) Inventor: Lisa Kay Beaty Bishop, 1211 Sailer Cir., Cape Girardeau, MO (US) 63701

( * ) Notice: Subject to any disclaimer, the term of this patent is extended or adjusted under 35 U.S.C. 154(b) by 127 days.

(21) Appl. No.: 11/973,249

(22) Filed: Oct. 5, 2007

(65) Prior Publication Data

US 2008/0087228 A1   Apr. 17, 2008

Related U.S. Application Data

(60) Provisional application No. 60/850,236, filed on Oct. 7, 2006.

(51) Int. Cl.
*A01K 1/02*   (2006.01)

(52) U.S. Cl. ........................ 119/474; 119/498

(58) Field of Classification Search ........... 119/452, 119/453, 454, 455, 456, 458, 474, 475, 482, 119/496, 497, 498, 499, 500, 504, 513, 514, 119/515, 702, 705, 706, 28.5; 297/184.14, 297/188.08, 188.13; D30/108, 109, 112, D30/118; 135/96, 115

See application file for complete search history.

(56) References Cited

U.S. PATENT DOCUMENTS

| | | | | | |
|---|---|---|---|---|---|
| 3,298,737 | A | * | 1/1967 | Rosenfeld et al. | 297/188.08 |
| 3,463,546 | A | * | 8/1969 | Giebel | 297/440.12 |
| 5,000,116 | A | * | 3/1991 | Fife et al. | 119/28.5 |
| 5,027,748 | A | * | 7/1991 | Wolak | 119/168 |
| 5,184,568 | A | * | 2/1993 | Healey | 119/482 |
| 6,000,752 | A | * | 12/1999 | Shyr | 297/188.08 |
| 6,062,169 | A | * | 5/2000 | Wade et al. | 119/165 |
| 6,155,637 | A | * | 12/2000 | Waters | 297/225 |
| 6,209,491 | B1 | * | 4/2001 | Olson | 119/706 |
| 6,286,456 | B1 | * | 9/2001 | Michaelis | 119/28.5 |
| 6,354,661 | B1 | * | 3/2002 | Moss | 297/229 |
| D481,496 | S | * | 10/2003 | Sequino | D30/112 |
| 6,702,378 | B2 | * | 3/2004 | Bullard | 297/224 |

* cited by examiner

*Primary Examiner*—T. Nguyen
(74) *Attorney, Agent, or Firm*—Shook Hardy & Bacon (57) ABSTRACT

A pet containment device for use with a chair comprises a cover for enclosing space underneath the chair. Said device also comprises other novel features that allow the device to connect to a seat of the chair and operate concomitantly with a folding chair. There is also provided a method of containing a pet.

13 Claims, 9 Drawing Sheets fig. 1 fig. 1a fig. 2 fig. 2a fig. 3 fig. 3a fig. 4 fig. 4a fig. 5

PET CONTAINMENT DEVICE AND METHOD

CROSS-REFERENCE TO RELATED APPLICATIONS

Applicant hereby claims the benefit of U.S. provisional application No. 60/850,236 filed on Oct. 7, 2006, said provisional application incorporated herein by reference.

STATEMENT REGARDING FEDERALLY SPONSORED RESEARCH OR DEVELOPMENT

Not applicable

INCORPORATION-BY-REFERENCE OF MATERIAL SUBMITTED ON A CD

Not applicable

BACKGROUND OF THE INVENTION

1. Field of the Invention

The present invention relates to animal enclosures and more particularly to devices for pet containment that are easily portable, collapsible, durable and washable.

2. Description of the Related Art

Many pet owners, for a variety of reasons, enjoy taking their pets with them to outside events and gatherings. Pet owners enjoy several benefits from this practice including, but not limited to, companionship, entertainment, and avoiding the costs of leaving a pet at home—such as costs from destruction by the pet and from hiring someone to take care of the pet. Furthermore, pets also benefit from opportunities to interact with their owners and other people and to get exercise.

At many types of outdoor events, such as sporting events and social gatherings, people utilize personal folding chairs, such as a 20"×20" chair with a collapsible metal frame and canvas back, seat, and arms. One can visualize a family, especially parents, spending a weekend at ball fields or parks, utilizing folding chairs. At many of these events and places, it is inappropriate for a pet owner to permit its pet to run, walk, or play freely, without some type of restraint. Not utilizing some type of restrictive device increases the risk of injury to the pet and to other attendees. For example, if not restrained a pet may be trampled or harassed by others or may not interact well with other attendees. This can raise problems for the pet owner who wishes to take his or her pet with the owner, but also wishes to remain seated and relaxed in his or her chair.

Many pet enclosures are available, such as claimed and described in U.S. Patent Application 2005/0005871 A2. Those pet enclosures describe a separate free-standing structure, generally comprising a rigid structure and cover, in which a pet can be housed.

Several drawbacks result from relying on a separate free-standing structure. For example, at crowded events, there may not be room to set up additional free-standing enclosures. In addition, a free-standing design requires a pet owner to carry additional bulky items to his or her destination. This can be especially difficult where a pet owner is also managing his or her pet and other items. Furthermore, when not in use, a free-standing structure takes up more storage space in a garage, closet, or wherever else it might be stored.

Therefore, a pet containment device that takes up less space both when in-use and when stored and which reduces the number and size of items a pet owner must transport to and from outside events would constitute a significant advancement in the art.

SUMMARY OF THE INVENTION

There is now provided a pet containment device for use with a chair, the device comprising a cover, wherein the cover surrounds space underneath the chair to form a pet enclosure. In a further embodiment of the present invention, the chair comprises means for releasable attachment, which can be engaged to corresponding means for releasable attachment on the cover. In an alternative embodiment, only the cover comprises means for releasable attachment, such that the device can be used regardless of whether or not a chair comprises means for releasable attachment.

There is further provided a method of containing a pet, the method comprising enclosing the space underneath a chair with a removable cover.

There is further provided a pet containment device for use with a chair, the device comprising a means for enclosing space underneath the chair.

The present invention discloses a pet containment device for use with a chair. The type of chair illustrated and discussed herein comprises a canvas folding chair, also commonly referred to as a travel chair, collapsible captains chair, quad chair, camp chair, and sports chair. However, this invention is not limited to use with those folding and collapsible chairs illustrated and discussed herein. One of ordinary skill in the art would recognize how the cover disclosed herein could be used with other styles of chairs.

The present invention presents several advantages. Primarily, it discloses a pet containment device that can attach to and operate concomitantly with a folding chair. Because the invention can collapse with and be stored and transported while attached to a folding chair, this invention reduces the number of items that one must haul to and from events and reduces the items one must store while not in-use. In addition, as opposed to a free standing enclosure, when in-use this invention saves space and reduces obstacle clutter because it utilizes the free space underneath a chair.

Moreover, because this invention is collapsible with a folding chair to which it is attached, embodiments of this invention comprise means and methods of securing the device and a chair in a collapsed position and preventing the resulting combination from unfolding at undesirable times, such as when transporting or storing the combination. Such functionality negates the need for chair user to carry a separate storage bag that can easily be misplaced, torn, or otherwise rendered ineffective. A further embodiment comprises a device, which when attached to a chair provides a means for carrying the chair. In addition, embodiments of this invention comprise a means for carrying a chair and cover unit, where the means can also be used as a leash for an animal. A further embodiment comprises a means for holding stakes, where the means also provides a handle with which to carry the chair. An additional embodiment of the present invention comprises means to enable the device to wrap around and connect to various sized chairs.

This invention possesses additional benefits. For example, embodiments comprise a removable cover so that the device is easily washable. In addition, embodiments comprise vents that keep contained pets cool and comfortable in warm conditions. Furthermore, embodiments comprise pockets, so that additional items can be transported with the device.

As used herein the phrases "means for releasably attaching" and "means for releasable attachment" refer to any and all devices that enable non-permanent connection of one object to another object, such that objects may be connected and disconnected when so desired. Examples of means for releasably attaching and means for releasable attachment may include, but are not limited to, clips, snaps, clasps, buttons, clamps, buckles, zippers, hook and loop strips, and ties.

DETAILED DESCRIPTION OF THE INVENTION

Figure 4:
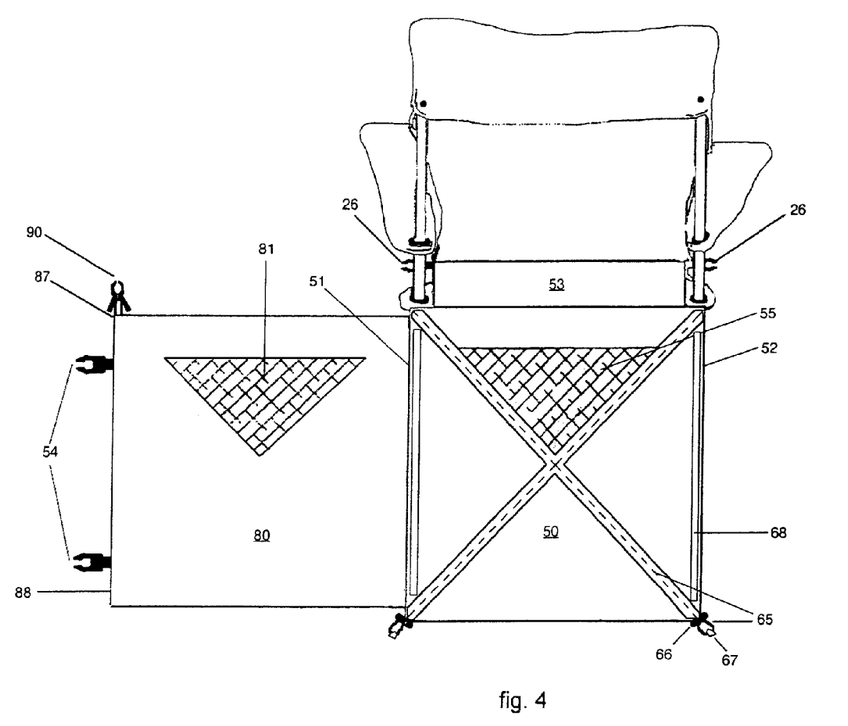
FIG. 4 is a back perspective view of the invention, assembled and attached to a folding chair, with a side edge of the wrapping panel open and not attached to the rest of the device.
Figure 4A:
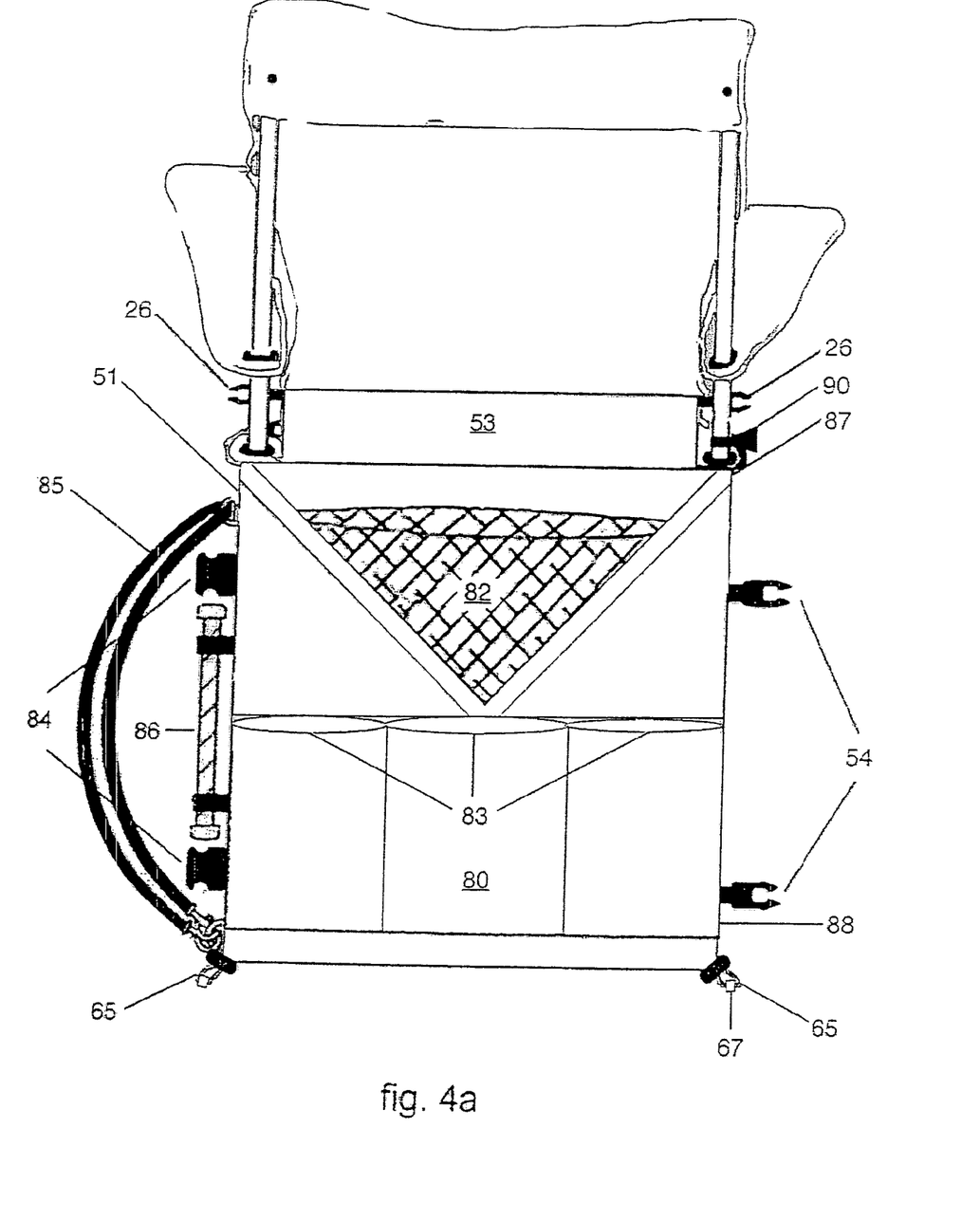
FIG. 4a is a back perspective view of the invention (as shown in FIG. 4) with a side edge of the wrapping panel attached to the device, thereby showing the components on the outside of the wrapping panel.
Figure 5:
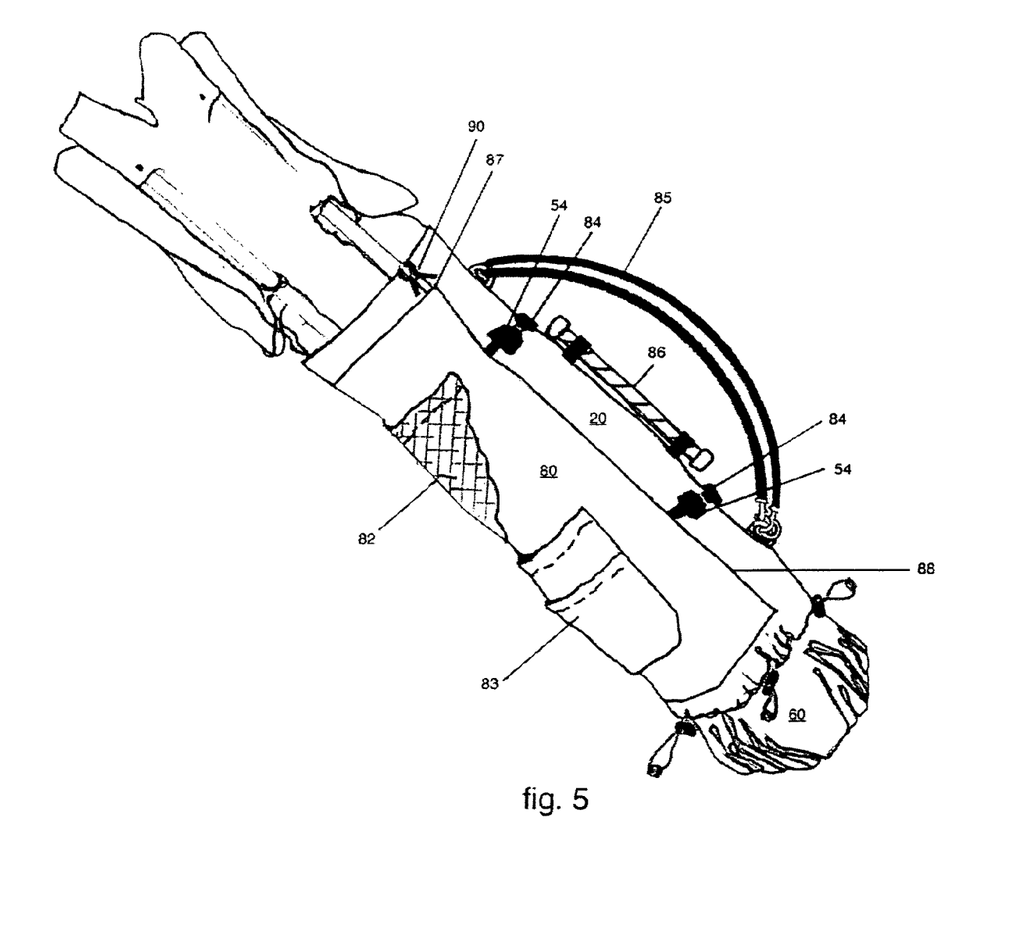
FIG. 5 illustrates the invention and chair in a collapsed state.

Throughout this detailed description of the invention and its preferred embodiments, the invention will be generally indicated by the number 10. Reference is generally made to all FIGS. 1-4a unless specifically indicated otherwise. Reference is made to FIG. 5 where specifically indicated. The present invention comprises a pet containment device for use with a chair, the device 10 comprising a means for enclosing space underneath the chair. In another embodiment the present invention comprises a method of containing a pet, said method comprising enclosing space underneath a chair with a cover. In further embodiments of said method, the cover comprises additional elements as further explained hereinafter.

In a further embodiment, the present invention comprises a pet containment device for use with a chair, the device 10 comprising a cover for enclosing space underneath the chair. As it may be desirable for said cover to be removable from a chair, one embodiment of the present invention also comprises first means for releasably attaching the cover to a chair. (This means for releasable attachment is identified as "first" as several other embodiments of the present invention also comprise other means for releasable attachment). In one embodiment, both the cover and the chair comprise corresponding first means for releasable attachment, which may be engaged to connect the cover to the chair in a non-permanent fashion. For example, several means for releasable attachment comprise more than one component that fit together to function as a non-permanent fastener, such as, but not limited to, zippers, snaps, ties, clamps, clasps, clips, hook and loop fastener strips, buttons, and buckles. In an embodiment in which both the chair and the cover comprise means for releasable attachment, the chair comprises one component of the means and the cover comprises a corresponding component of the means, whereby when the corresponding components are connected, the chair and the cover are temporarily fastened. In an alternative embodiment, the cover for enclosing space underneath the chair and the chair itself may be fashioned as one unit.

However, it may be desirable for the present invention to be utilizable with a chair regardless of whether the chair comprises means for releasable attachment. In an alternative embodiment of the present invention, the cover comprises first means for releasable attachment. For example, as shown in FIG. 2a, in one embodiment of the present invention, the first means for releasably attaching the cover to a chair comprises at least one panel 70 for positioning on top of the chair's seat, said panel 70 connected to one side of the cover and said panel 70 comprising second means for releasable attachment to one or more other sides of the cover. In a further embodiment of the present invention, second means for releasable attachment are selected from a group consisting of zippers, hook and loop strips, buttons, clips, ties, buckles, buttons, snaps, and clasps. As shown in FIG. 2a, in one embodiment second means for releasable attachment comprise zippers, whereby edge 73 and edge 33 can be zipped together and edge 72 and edge 43 can be zipped together.

In another embodiment of the present invention, said cover comprises panels that are contiguously connected such that the panels can be arranged, folded, and attached to surround and enclose space underneath a chair. Those of skill in the art will appreciate the device 10 could be altered to have any number of panels, and could be a variety of other shapes and sizes. Such alterations capabilities are preferable as they allow the device 10 to fit chairs of all sizes and shapes and accommodate pets of all sizes.

Figure 1:
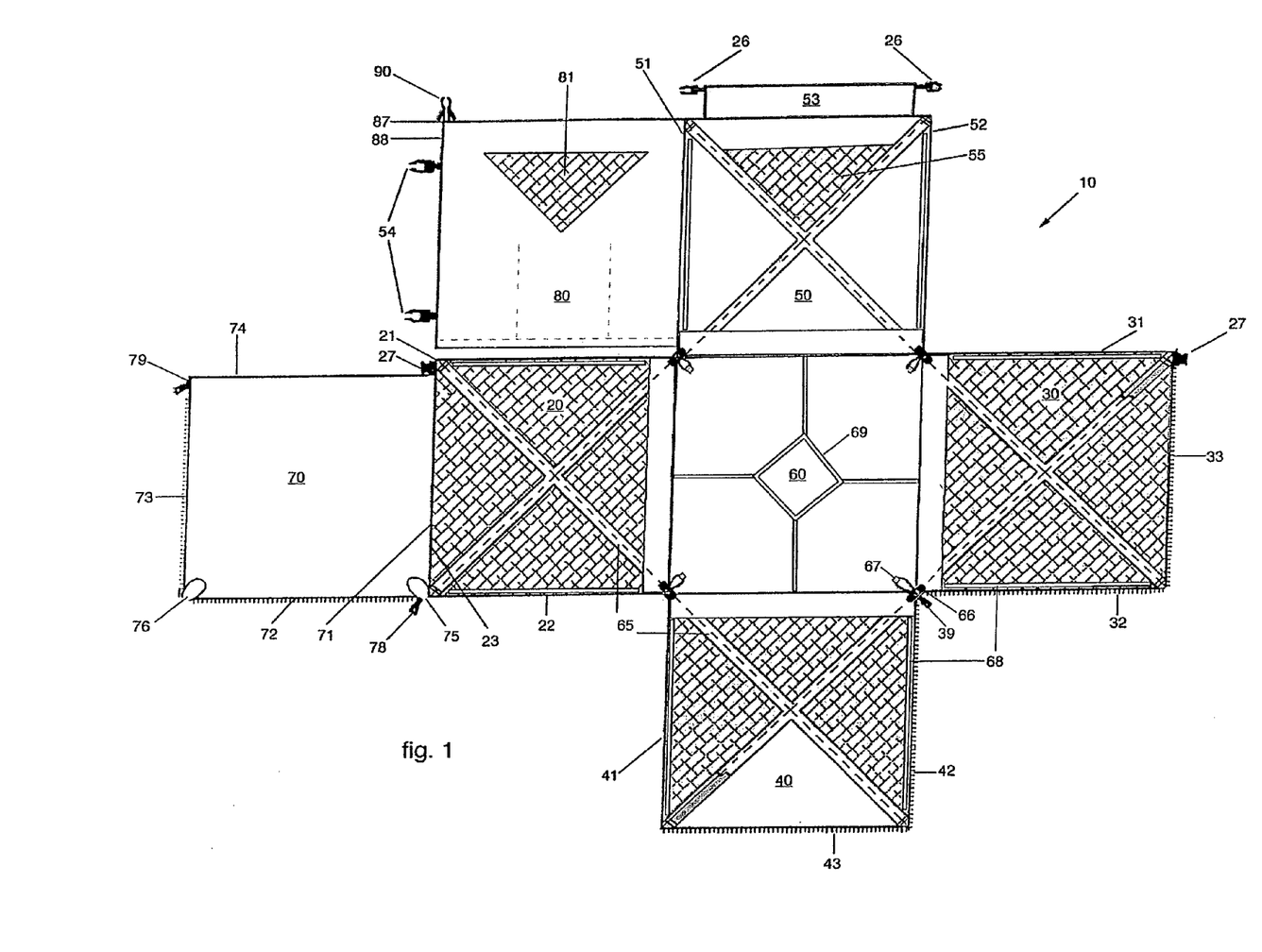
FIG. 1 is an aerial perspective view of the invention unfolded and lying flat, not attached to a chair.
Figure 1A:
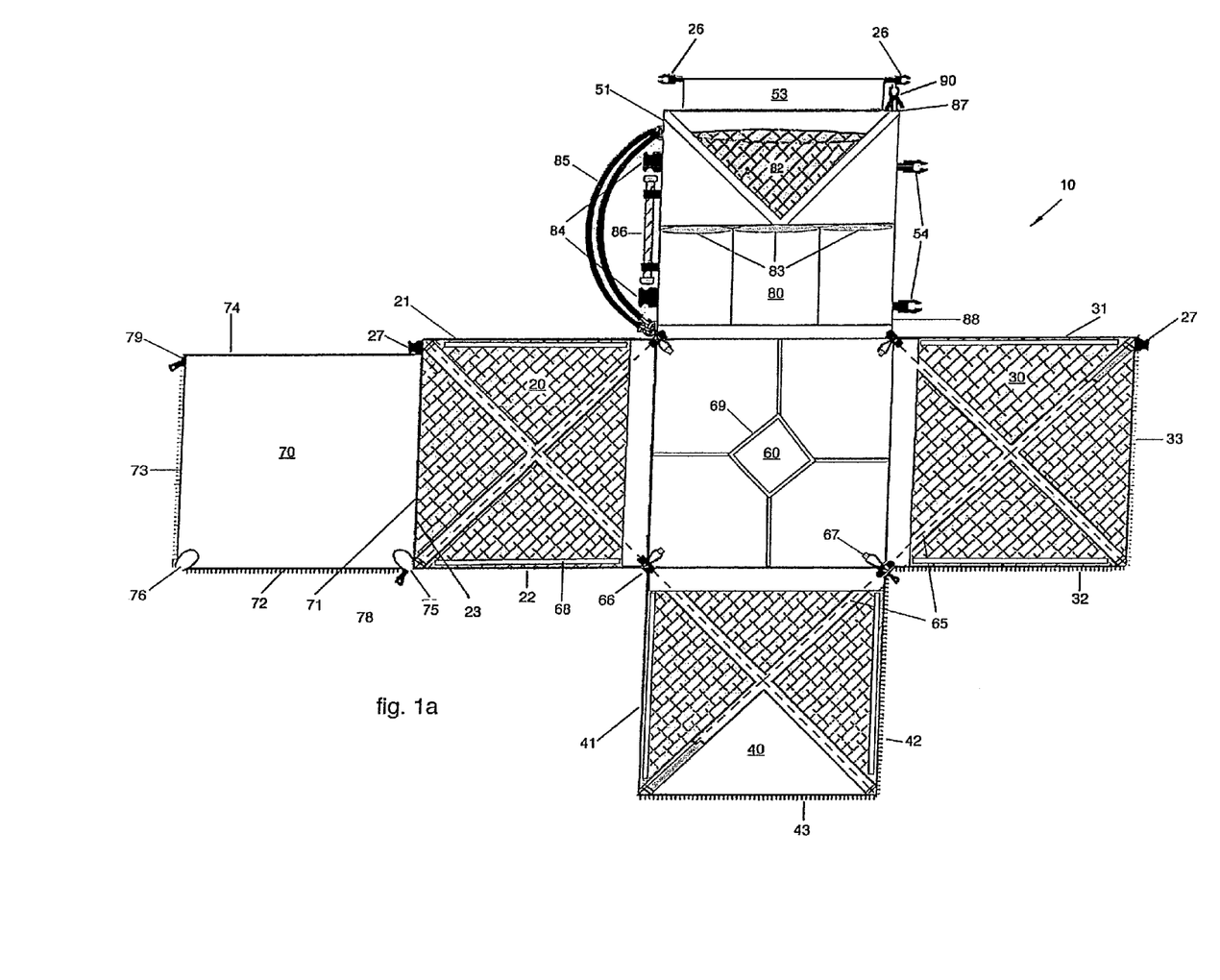
FIG. 1a is an aerial perspective view of the invention (as shown in FIG. 1) where a wrapping panel is folded on top of a back panel.

As shown in FIGS. 1 and 1a, in one embodiment the device 10 comprises a first side panel 20 and a second side panel 30, a front panel 40 and a back panel 50, and a bottom panel 60 and a top panel 70. FIGS. 1 and 1a show the device lying flat; however, as shown in FIGS. 2-4a, after attaching panels, the device 10 can be folded and assembled in a fashion to create a cover. When the device 10 is coupled with a chair as shown in FIGS. 2a-4a, the device encloses space underneath the chair for use as a pet enclosure.

In one embodiment of the present invention, the device comprises a back panel 50 attached to a first side panel 20, a second side panel 30, and a bottom panel 60. Accordingly, the flat cover shown in FIGS. 1 and 1a could be folded and connected such that back panel first edge 51 attaches to first side panel back edge 21. Further, back panel second edge 52 attaches to second side panel back edge 31. In one embodiment, these edges are securely attached. In a further embodiment, the means for secure attachment may be one of many means known in the art, one of which is stitching. In another embodiment, these edges are releasably attached. In a further embodiment, the means for releasable attachment may be one of many means known in the art, including, but not limited to, zipper, hook and loop strips, buckles, snaps, and clips. While for illustrative and explanation purposes, panels are shown attached at edges, the present invention comprises all embodiments in which panels and their respective means for attachment or releasable attachment are assembled in such a way as to create an enclosure. These elements could alternatively be connected at non-edge portions of the device.

In another embodiment of the present invention, the device comprises a front panel 40 attached a first side panel 20, a second side panel 30, and a bottom panel 60. Accordingly, the flat cover illustrated in FIGS. 1 and 1a could be folded and connected such that first front panel first edge 41 attaches to first side panel front edge 22. Further, second front panel second edge 42 attaches to second side panel front edge 32. In one embodiment, these edges are securely attached. In a further embodiment, the means for secure attachment may be one of many means known in the art, one of which is stitching. In another embodiment, these edges are releasably attached. In a further embodiment, the means for releasable attachment may be one of many means known in the art, including, but not limited to, zipper, hook and loop strips, buckles, snaps, and clips. In one embodiment of the present invention, a front panel second edge 42 is attached to the second side panel front edge 32 by a zipper 39. Said attachment is illustrated in FIGS. 2, 2a, 3, and 3a. Said zipper allows one access to the underneath portion of the chair and provides a closable opening through which one can place a pet. While for illustrative and explanation purposes, panels are shown attached at their edges, the present invention comprises all embodiments in which panels and their respective means for attachment or releasable attachment are assembled in such a way as to create an enclosure. These elements could alternatively be connected at non-edge portions of the device.

Figure 2:
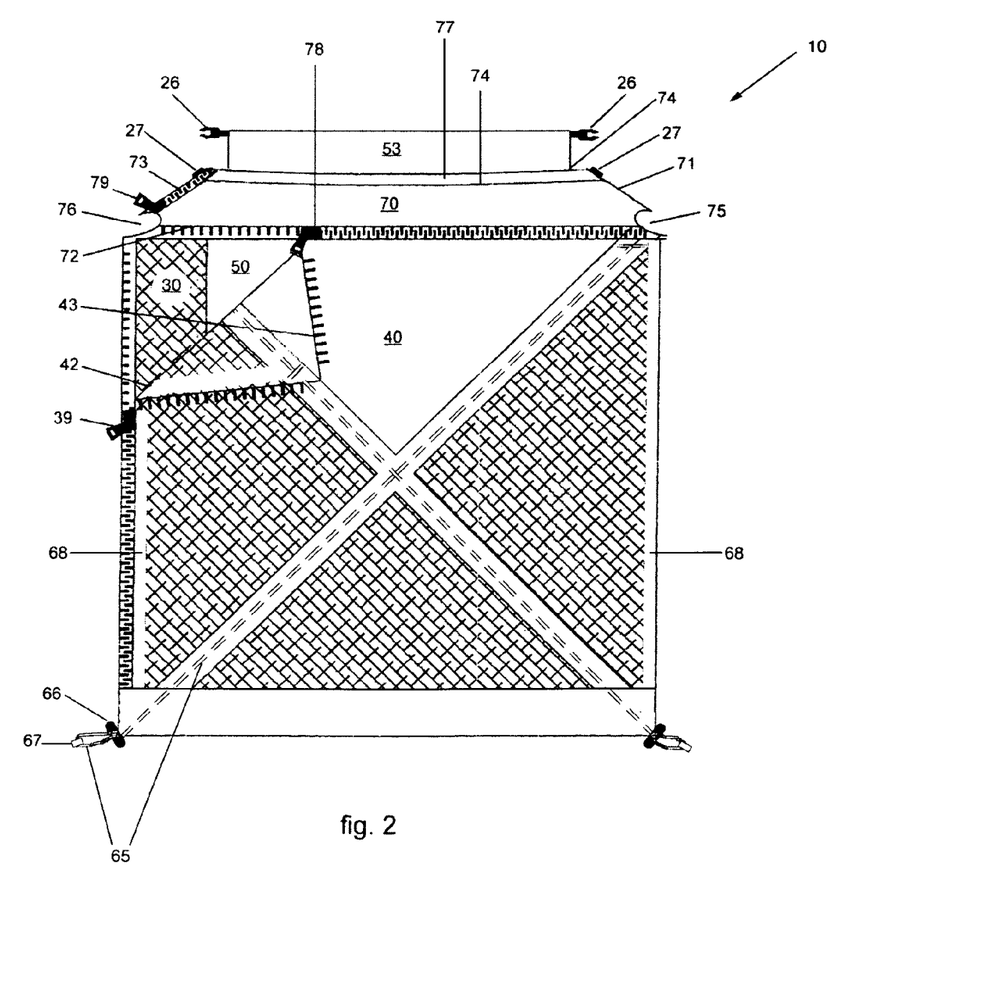
FIG. 2 is a front perspective view of the invention, in an assembled state and not attached to a chair, with the front panel partially open at a corner
Figure 2A:
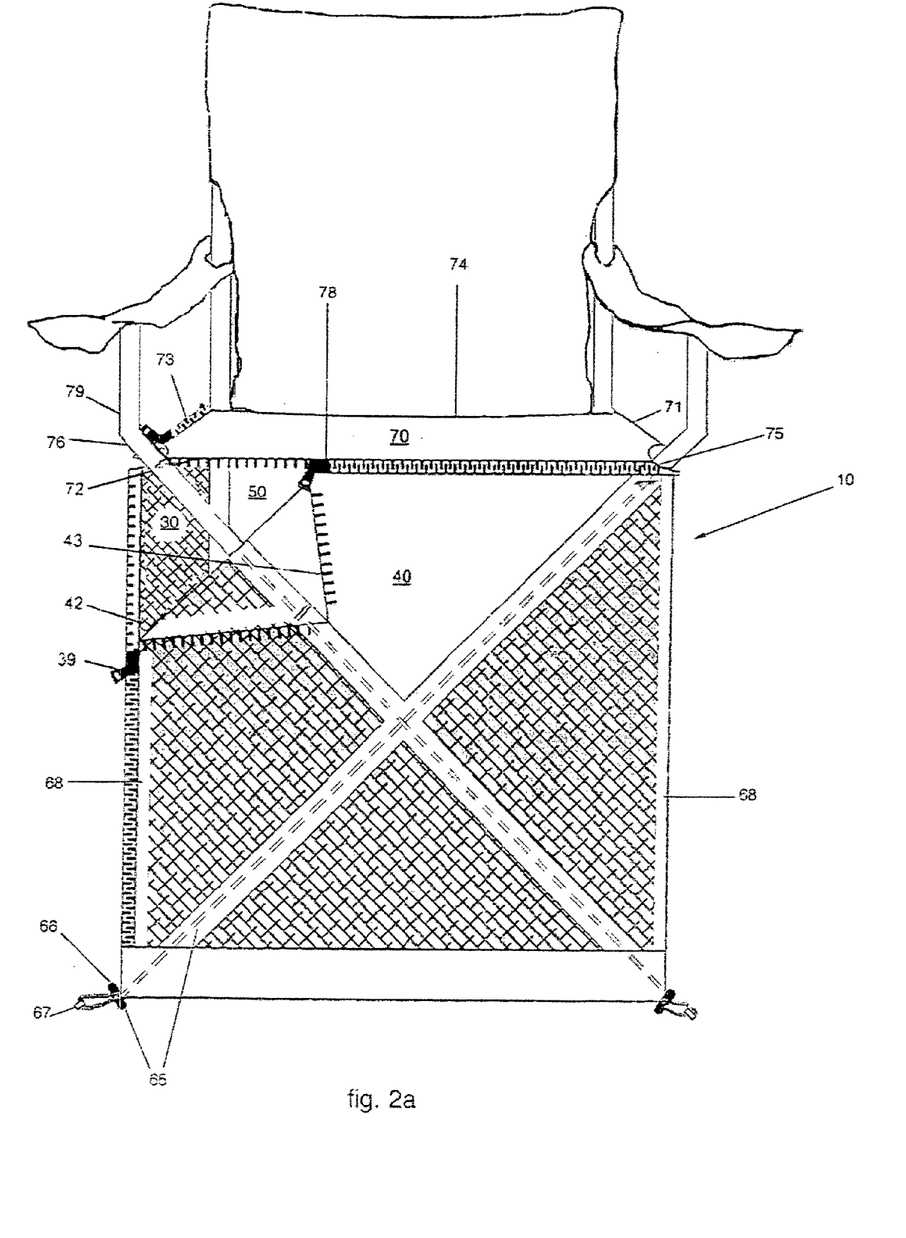
FIG. 2a is a front perspective view of the invention, assembled (as shown in FIG. 2) and attached to a folding chair, with the front panel partially open at a corner to illustrate how the invention fits around chair components.
Figure 3:
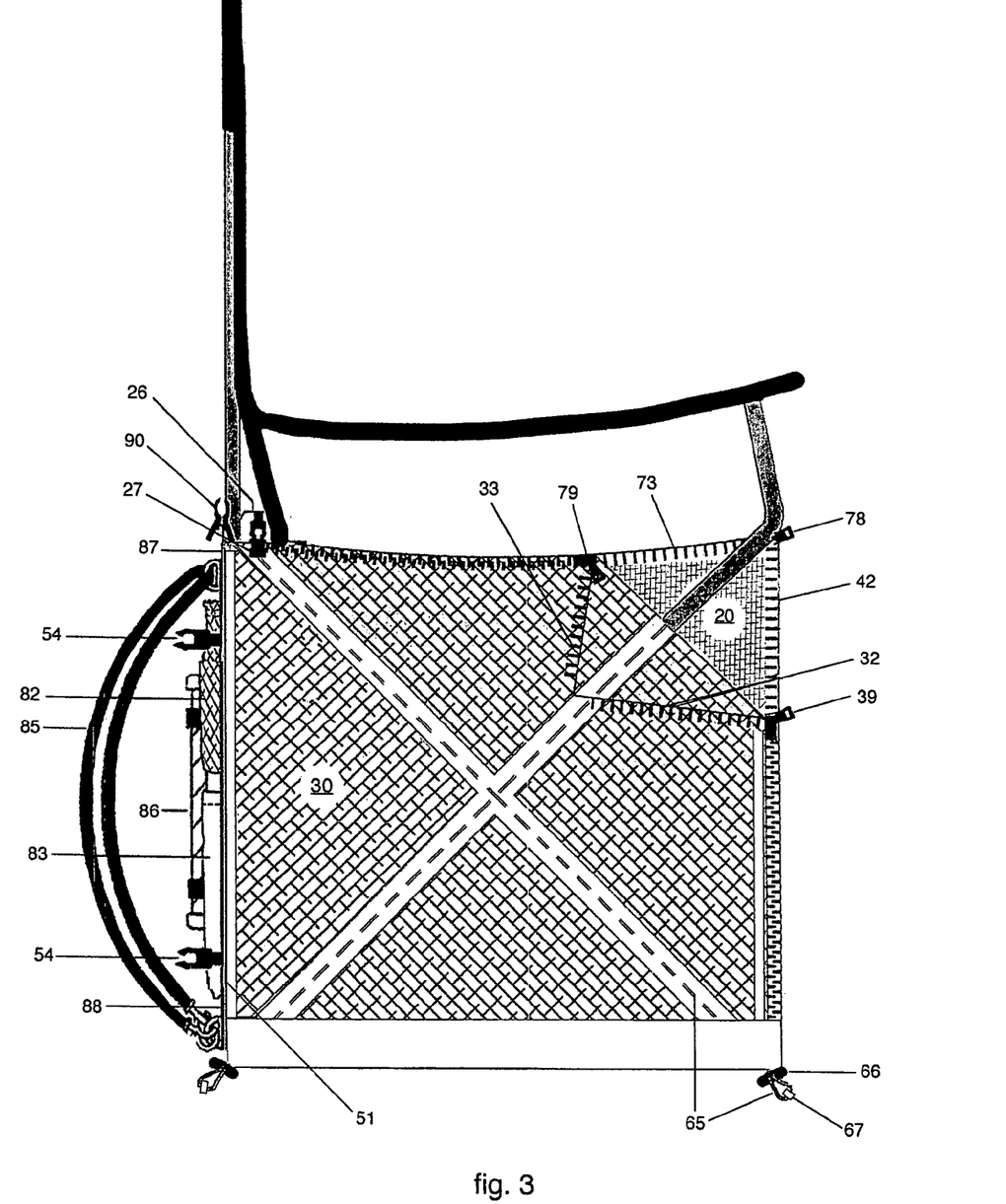
FIG. 3 is a side perspective view of the invention, assembled and attached to a folding chair, with a side panel partially open at a corner to illustrate how the invention fits around chair components.
Figure 3A:
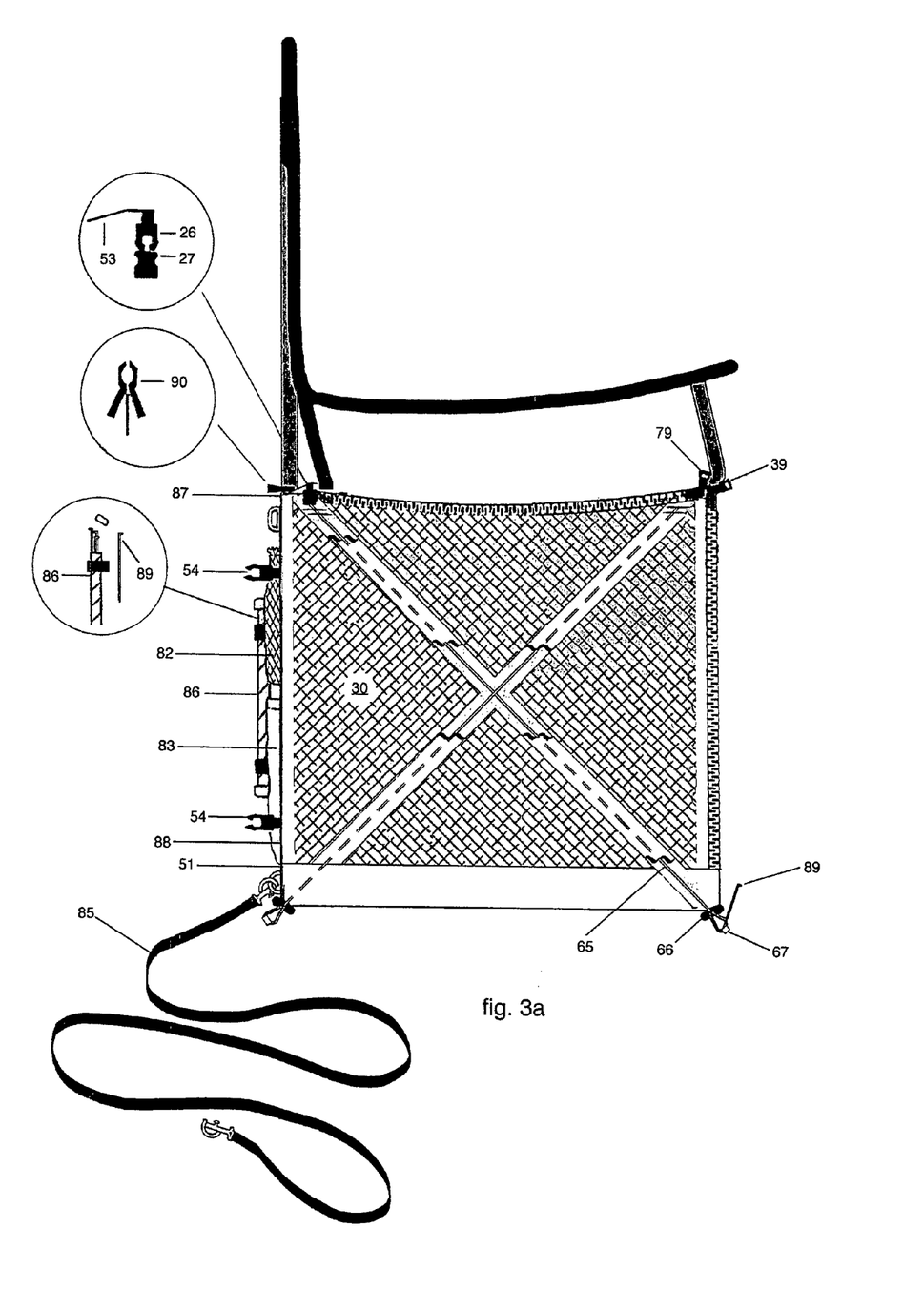
FIG. 3a is a side perspective view of the invention (as shown in FIG. 3), assembled and attached to a folding chair.

Referring to FIGS. 1-3a, in one embodiment the top panel 70 provides first means for releasably attaching the device 10 to a seat portion of a chair. In a further embodiment, the top panel 70 comprises four edges: a top panel first edge 71 secured to a first side panel top edge 23; a top panel second edge 72 comprising second means for releasable attachment to a front panel top edge 43; a top panel third edge 73 comprising second means for releasable attachment to a second side panel top edge 33; and a top panel fourth edge 70 free from attachment to other portions of the device 10. In one embodiment, the second means for releasably attaching edge 43 to edge 72 and releasably attaching edge 73 to edge 33 comprise releasably attachable fasteners. In a further embodiment, the releasably attachable fasteners may be selected from the group consisting of, but not limited to, zippers, hook and loop strips, buckles, snaps, and clips. In one embodiment, as shown in FIGS. 2 and 2a, edges 72 and 43 are releasably attached by a zipper 78. In one embodiment, as shown in FIGS. 3 and 3a, edges 73 and 33 are releasably attached by a zipper 79.

In one embodiment of the present invention, the device 10 comprises openings through which a chair back, chair legs, and chair arm supports can fit. Referring to FIGS. 1-2a, in one embodiment of the present invention, the device 10 comprises openings at corner D 75 and corner E 76 through which chair arm supports can fit. These openings, i.e., notches, voids, holes, etc., are positioned in the top panel 70 to allow the top panel 70, and in turn the device 10, to fit around chair arm supports.

In another embodiment, the device 10 comprises an opening through which a chair back can fit. In one embodiment, a top panel fourth edge 74 remains free from attachment to other portions of the device 10, whereby when the top panel 70 is attached to the front panel 40 and second side panel 30, a gap 77, formed between the top panel fourth edge 74 and the back panel 50, provides an opening 77 through which a chair back can fit. Said gap 77 is illustrated in FIG. 2 and a chair back is shown extending through said gap in FIG. 2a.

In one embodiment, the present invention 10 comprises a means to prevent a contained pet from escaping out of an opening 77 formed where the top panel fourth edge 74 meets the back panel 50. In a further embodiment, the prevention means comprises third means for releasable attachment connected to a top portion of back panel 50, said third means attachable to a first side panel 20 and to a second side panel 30. In a further embodiment, the cover also comprises an extension 53 of the back panel's top edge. When the device 10 is combined with a chair, the extension 53 reaches up along the back side of the chair back. In a further embodiment, the extension 53 comprises third means for releasable attachment to the side panels. In another embodiment, third means for releasable attachment comprises buckles attached to the extension 53, said buckles comprising opposite and corresponding portions attached to side panels. FIGS. 3-4a illustrate embodiments of the present invention wherein male buckle portions 26 are attached to the extension 53, said male buckle portions 26 corresponding and capable of attachment to female buckle portions 27 located on side panels. FIG. 3-4a illustrate embodiments of the device 10 wherein a buckle portion 26 provides means to wrap around the chair back support frame. In one embodiment, the device 10 comprises buckles 26 and 27 as shown in a blown-up portion of FIG. 3a.

In one embodiment of the present invention, when the device 10 is integrated with a chair, zippers 39, 78, and 79 provide access to the space under the chair, thereby providing means through which one can place and remove a pet within the device 10.

When the device 10 is integrated with a chair, as above-described, collapsing the chair will cause the device 10 in turn to collapse. One advantage of the present invention comprises the device's ability to remain attached to and be stored with a collapsed folding chair. In one embodiment, the present invention comprises means for securing the device 10 and chair in a collapsed position when chair legs are collapsed.

In one embodiment the means for securing the device and chair in a collapsed position comprises means for releasable attachment. In a further embodiment, the means is selected from the group consisting of clips, clamps, buckles, snaps, zippers, and hook and loop strips. In a further embodiment, said means are positioned at various positions on the device and can be engaged upon collapsing the chair to hold the chair in its collapsed position.

Referring to FIGS. 1, 1a, 4, 4a, and 5, in another embodiment of the present invention, the means for securing the chair and attached device 10 in a collapsed position comprises a wrapping panel 80 attached to said device 10. In a further embodiment, said wrapping panel 80 is connected to the back panel 50. In one embodiment, the wrapping panel 80 is connected to the back panel 50 at edge 51. In one embodiment, the wrapping panel is securely attached to the device 10 at edge 51 by stitching. In a further embodiment the wrapping panel 80 comprises a corner 87, said corner 87 comprising fifth means for releasable attachment to the chair or to the device. In one embodiment, the means for releasable attachment is selected from the group consisting of, but not limited to, snaps, clamps, clips, hook and loop strips, and zippers. In a further embodiment, as shown in FIGS. 1, 1a, 3-5, said means comprises a clamp 90 attached to the corner 87 of the device 10. In one embodiment, the device comprises clamps 90 as shown in a blown-up portion of FIG. 3a. In one embodiment, the device 10 comprises a clamp 90 at corner 87, said clamp 90 providing means to secure the wrapping panel 80 to the outside of the device 10, the wrapping panel 80 thereby positioned on the outside of the back panel 50.

In a further embodiment, a wrapping panel edge 88 comprises fourth means for releasable attachment. In one embodiment, the fourth means for releasable attachment is a releasable fastener. In a further embodiment the releasable fastener is selected from the group consisting of, but not limited to, snaps, clamps, clips, buckles, hook and loop strips, and zippers.

In one embodiment, as shown in FIGS. 1, 1a, 4, 4a, and 5, the fourth means for releasable attachment comprises buckles, said buckles comprising a male portion 54 and a female portion 84 (84 is not shown in FIG. 1 and FIG. 4). In one embodiment (as shown in FIG. 5) when the chair collapses and the chair legs fold towards the center of the space underneath the chair, the wrapping panel's second edge 88 releases, such as by clip 90, and wraps around the collapsed chair legs and device 10 and attaches to the device 10 by connecting to the female buckle portions 84, thereby securing the chair and cover in a collapsed position and preventing the chair legs from unfolding.

In a further embodiment, the device 10 comprises a bottom panel 60. The bottom panel 60 comprises a floor for the pet enclosure and is preferably made of a durable water resistant fabric. In a further embodiment, referring to FIG. 5, the bottom panel 60 provides support for the chair legs, thereby preventing the collapsed chair from slipping through the wrapping panel 80. The device 10 thereby eliminates the need for a separate carrying and storage bag for the chair.

An additional embodiment of the present invention comprises a flexible member 85, releasably attached to either the back panel 50 or the wrapping panel 80. In one embodiment, the flexible member 85 is releasably attached by a clasp. When the chair is in-use, in one embodiment the flexible member 85 can be used as a leash to restrain a pet. Furthermore, when the chair is in a collapsed state (see FIG. 5), in one embodiment the flexible member 85 comprises a handle or strap to carry the chair and cover combination.

In another embodiment the device 10 comprises breathable mesh material to provide ventilation for an enclosed animal. The present invention comprises all panel combination designs or patterns of breathable and non-breathable fabrics out of which the cover may be made.

In another embodiment the wrapping panel 80 and back panel 50 comprise corresponding breathable mesh portions 81 and 55. In a further embodiment, the wrapping panel 80 comprises pockets, with at least one pocket 82 fixed to the mesh portion 81 of the wrapping panel. This pocket 82 can be used to store an ice pack or other cooling means for transferring cool air into the enclosure through the corresponding mesh portion 55 of the back panel 50. In another embodiment additional pockets 83 can be used to store useful items such as toys, food, water, and bowls. In another embodiment, the back panel 50 comprises a pocket fixed to the mesh portion of the back panel 50 for holding an animal cooling means, such as an ice pack.

In another embodiment of the present invention, the device 10 further comprises means for enabling the cover to fit around and attach to various sized chairs. In one embodiment the means comprises elastic sewn into the cover. In a further embodiment, the means comprises a combination of encasement portions, flexible members 65, and elastic members 68 and 69. In an embodiment comprising said combination, said encasement portions are sewn into the cover and extend diagonally across cover panels. Further, said flexible members' ends are attached within the encasement portions at panel corners and said flexible members 65 extend through the encasement portions diagonally across panels. Further, at bottom corners of the device, sections of the flexible members 65 are exposed outside of the encasement, said exposed sections each passing through a barrel cord lock 66, thereby forming a loop at each bottom corner. Preferably, an object, such as rubber tubing 67, is wrapped around the exposed section along the formed loop to prevent the barrel cord lock 66 from slipping off of the flexible member 65. Finally, in said combination, elastic members 68 and 69 are sewn into the cover along vertical panel edges and within the bottom panel. Said combination enables the device to fit on chairs of various sizes. For example, the flexible members 65 can be adjusted as a draw cord using the barrel cord locks 66. The device can be adjusted to a largest size by stretching the elastic members 68 and 69 and adjusting the barrel cord locks 66 to limit the length of the flexible member exposed segment. The device can be adjusted to a smaller size by drawing the flexible members 65 with the barrel cord lock 66 and allowing the elastic members 68 and 69 to compress. Within the various figures illustrating embodiments of this invention, flexible members 65 are shown as dashed lines, indicating their existence in encasement portions. However, FIGS. 1, 1a, and 3a show a section of the encasement portion cut-away to reveal flexible members 65 shown as a complete line.

In another embodiment the present invention comprises loops or rings attached to the base of the device 10. These loops provide a structure through which stakes may be placed into the ground to secure the chair and device 10 in place and to prevent the chair and device 10 combination from tipping over. In another embodiment as shown in FIGS. 2, 2a, 3, 3a, 4 and 4a said loops are formed by exposed sections of flexible member 65.

In another embodiment the present invention comprises a container 86 with a top and bottom attached to either the back panel 50 or wrapping panel 80. In one embodiment, the container 86 provides a storage means in which one may store stakes used to secure the chair and device combination from tipping over. In a further embodiment, the container 86 comprises a carrying handle when the device and chair are in a collapsed position (as shown in FIG. 5). This allows the owner to use the strap 85 as a leash when transporting the chair.

In another embodiment, the present invention comprises means for preventing the chair and device 10 combination from unintentionally collapsing, such as might occur if a user tips over. In one embodiment the means comprises a device releasably secured onto the chair frame at the chair's bending or sliding junctions to prevent such bending or sliding. In one embodiment, said means is selected from the group consisting of hook and loop strips, clips, buckles, and clamps. In one embodiment, a clamp 90 attached to the device 10, comprises a collapsing prevention means, where said clamp 90 can attach to the chair as shown in FIGS. 3a and 4a. In one embodiment, said clamp attaches to both prevent the chair from collapsing and releasably attach the wrapping panel 80.

In another embodiment, the invention comprises means to enable the device 10 to maintain a box-like structure. In one embodiment, the means comprises slots sewn into the cover side, front, and back panels and edges into which straight rods can be inserted. In one embodiment the slots extend straight and extend from the top of the panel to the bottom of the panel.

The present invention could be manufactured of a variety of materials. In one embodiment, the panels comprise materials which are durable, breathable, and washable. In a further embodiment the bottom panel comprises water resistant material.

The many features and advantages of the present invention will be apparent from the above description. Since numerous modifications and changes may be evident to and executed by those skilled in the art, the invention is not limited to the exact construction and operation illustrated and described herein.

Accordingly, such modifications and changes are believed to be within the scope and sphere of the present invention.

I claim:

1. A pet containment device for use with a chair comprising a seat portion and space underneath the seat portion, said device comprising:
   a set of panels that are usable to surround the space underneath the seat portion, the set of panels comprising:
   (1) a first side panel and a second side panel positioned on sides of the space,
   (2) a front panel positioned on a front of the space,
   (3) a back panel positioned on a back of the space,
   (4) a bottom panel positioned on a bottom of the space, and
   (5) a top panel that is positionable on top of the seat portion,
      (a) wherein the top panel is connected to the first side panel, and
      (b) wherein the top panel comprises a first releasable fastener for attachment to the second side panel; and a wrapping panel attached to an edge of the back panel, the wrapping panel including:
      (a) a second releasable fastener attached to an edge of the wrapping panel, wherein the second releasable fastener secures the set of panels in a bundled arrangement, and
      (b) a third releasable fastener connected to the set of panels, wherein the third releasable fastener secures the wrapping panel against the back panel when the set of panels are in an expanded arrangement.

2. The device according to claim 1, wherein the first releasable fastener is selected from a group consisting of zippers, hook and loop strips, clips, ties, buckles, snaps, and clasps.

3. The device according to claim 1, wherein the first releasable fastener is zippers.

4. The device according to claim 1, wherein a top portion of the back panel comprises a fourth releasable fastener that is attached to at least one of the first side panel and the second side panel so as to prevent a pet from escaping out of the enclosure.

5. The device according to claim 4, wherein the fourth releasable fastener is selected from a group consisting of zippers, hook and loop strips, clips, clamps, ties, buckles, snaps, and clasps.

6. The device according to claim 1, wherein the third releasable fasteners are buckles.

7. The device according to claim 1, wherein the wrapping panel comprises pockets.

8. The device according to claim 7, wherein one pocket comprises mesh, said mesh pocket corresponding to a mesh portion of the set of panels.

9. The device according to claim 1 further comprising a first flexible member, said first flexible member having a distal end and proximal end, each of which respectively include a sixth releasable fastener and seventh releasable fastener, whereby when both ends are attached to the device said flexible member is usable as a carrying strap and when one end is attached to the device said flexible member is usable as a leash.

10. The device according to claim 1 further comprising means for enabling the cover to fit around and attach to various sized chairs.

11. The device according to claim 1 further comprising:
    an encasement sewn into the set of panels;
    flexible members attached within and extending through said encasement, said flexible members having an exposed portion outside of the encasement, said exposed portion exiting and entering the encasement, said exposed portion having a barrel cord lock connected thereto, thereby forming a loop with the flexible member outside of the encasement; and
    elastic members sewn into the set of panels.

12. The device according to claim 1 further comprising a tubular container attached to the set of panels, said container comprising a bottom and a top, said container for storing stakes inserted into the ground to prevent the device from tipping over and said container for carrying the device and chair when in a collapsed arragned.

13. A pet containment device for use with a chair comprising a seat portion and space underneath the seat portion, said device comprising:
    a set of panels that are usable to surround the space underneath the seat portion, the set of panels comprising:
    (1) a first side panel and a second side panel positioned on sides of the space,
    (2) a front panel positioned on a front of the space,
    (3) a back panel positioned on a back of the space,
    (4) a bottom panel positioned on a bottom of the space, and
    (5) a top panel that is positionable on top of the seat portion,
       (a) wherein the top panel is connected to the first side panel, and
       (b) wherein the top panel comprises a first releasable fastener for attachment to the second side panel; and
    a means for wrapping attached to one of the edges of the back panel, the means for wrapping including:
       (a) a second releasable fastener attached to an edge of the means for wrapping, wherein the second releasable fastener secures the set of panels in a bundled arrangement, and
       (b) a third releasable fastener connected to the set of panels, wherein the third releasable fastener secures the means for wrapping against the back panel when the set of panels are in an expanded arrangement.

* * * * *